US012282392B2

(12) United States Patent
Akavaram et al.

(10) Patent No.: US 12,282,392 B2
(45) Date of Patent: Apr. 22, 2025

(54) INTERCONNECTS BETWEEN CHIPLETS AND RELATED LINK INITIALIZATION PROTOCOLS

(71) Applicant: QUALCOMM Incorporated, San Diego, CA (US)

(72) Inventors: Santhosh Reddy Akavaram, Hyderabad (IN); Prakhar Srivastava, Lucknow (IN); Aditya Singh Patel, Jabalpur (IN); Yogananda Rao Chillariga, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/461,287

(22) Filed: Sep. 5, 2023

(65) Prior Publication Data

US 2025/0077355 A1 Mar. 6, 2025

(51) Int. Cl.
*G06F 11/00* (2006.01)
*G06F 11/14* (2006.01)
(52) U.S. Cl.
CPC ...... *G06F 11/1438* (2013.01); *G06F 11/1443* (2013.01)
(58) Field of Classification Search
CPC .................................................. G06F 11/1443
See application file for complete search history.

(56) References Cited

U.S. PATENT DOCUMENTS

2010/0083030 A1\* 4/2010 Thayer ................ G06F 11/0745
714/748
2022/0327276 A1 10/2022 Seshan et al.

FOREIGN PATENT DOCUMENTS

JP 2011248814 A 12/2011

OTHER PUBLICATIONS

International Search Report and Written Opinion—PCT/US2024/036030—ISA/EPO—Oct. 9, 2024.

\* cited by examiner

*Primary Examiner* — Jason B Bryan
(74) *Attorney, Agent, or Firm* — Loza & Loza, LLP/Qualcomm

(57) ABSTRACT

Aspects of the disclosure provides various systems, apparatuses, and techniques for reducing latencies and power consumption of link training or retraining. In some aspects, the techniques use a specific register to identify the cause of link retraining. Based on the identified reasons of link retraining, the apparatus can selectively skip the initialization of certain redundant lanes of the link. In some aspects, the Universal Chiplet Interconnect Express (UCIe) Link Training and Status State Machine (LTSSM) can be configured to identify whether link retraining is initiated as part of a trainerror or linkerror exit or not. A UCIe device can have a redundant_recovery (RR) register that can be set to different values to identify the cause of link retraining (e.g., due to trainerror/linkerror or not).

30 Claims, 11 Drawing Sheets

INTERCONNECTS BETWEEN CHIPLETS AND RELATED LINK INITIALIZATION PROTOCOLS

TECHNICAL FIELD

The present disclosure relates generally to integrated circuit technology and, more particularly to communication interconnects between chiplets and related link initialization protocols.

BACKGROUND

A computer system may include a single or multiple integrated circuits with multiple cores or processors present on one or more individual integrated circuit device. A integrated circuit device can include one or more dies, which may include various components, for example, processing cores, graphical processors, interfaces, memory, etc. Multiple integrated circuit dies may be included in the same package, and on-package interconnects can be used to connect the dies together. In some examples, an integrated circuit die can be referred to as a chiplet. A chiplet is a functional unit that performs certain specific tasks or provides certain functionality within an integrated circuit device containing multiple chiplets.

An example of integrated circuit interconnect is the Universal Chiplet Interconnect Express (UCIe). UCIe is an open, multi-protocol capable, on-package interconnect standard for connecting multiple dies on the same package. UCIe can support multiple protocols (Peripheral Component Interconnect Express (PCIe), Compute Express Link (CXL), etc.) on top of a common physical and link layer. The UCIe can provide interoperability across a wide range of devices having different performance characteristics.

SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Certain aspects of the disclosure relate to integrated circuit (IC) devices that include multiple chiplets or dies that are connected using an IC interconnect. One example of the IC interconnect is the Universal Chiplet Interconnect Express (UCIe) link that can be used to connect chiplets included in an IC device.

In various aspects of the disclosure, a method for controlling a Universal Chiplet Interconnect Express (UCIe) link using a Link Training and Status State Machine (LTSSM) comprises: determining a cause of a reset event in the LTSSM; and initializing a main-band of the UCIe link in a main-band initialization state (MBINIT) of the LTSSM with a plurality of redundant main-band lanes being excluded in response to the cause being other than a trainerror or a linkerror.

In various aspects of the disclosure, an integrated circuit device comprises: a communication interface configured to control a Universal Chiplet Interconnect Express (UCIe) link using a Link Training and Status State Machine (LTSSM); and one or more processors connected to the communication interface. The one or more processors are configured to: determine a cause of a reset event in the LTSSM; and initialize a main-band of the UCIe link in a main-band initialization state (MBINIT) of the LTSSM with a plurality of redundant main-band lanes being excluded in response to the cause being other than a trainerror or a linkerror.

In various aspects of the disclosure, an apparatus including a plurality of chiplets, comprises: a Universal Chiplet Interconnect Express (UCIe) link connected between the plurality of chiplets; means for determining a cause of a reset event in a Link Training and Status State Machine (LTSSM) used to control the UCIe link; and means for initializing a main-band of the UCIe link in a main-band initialization state (MBINIT) of the LTSSM with a plurality of redundant main-band lanes being excluded in response to the cause being other than a trainerror or a linkerror.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

Aspects of the disclosure provides various systems, apparatuses, and techniques for reducing latencies and power consumption of link retraining. In some aspects, the techniques use a specific register to identify the cause of link retraining. Based on the identified reasons of link retraining, the apparatus can selectively skip the initialization of certain redundant lanes of the link.

Figure 1:
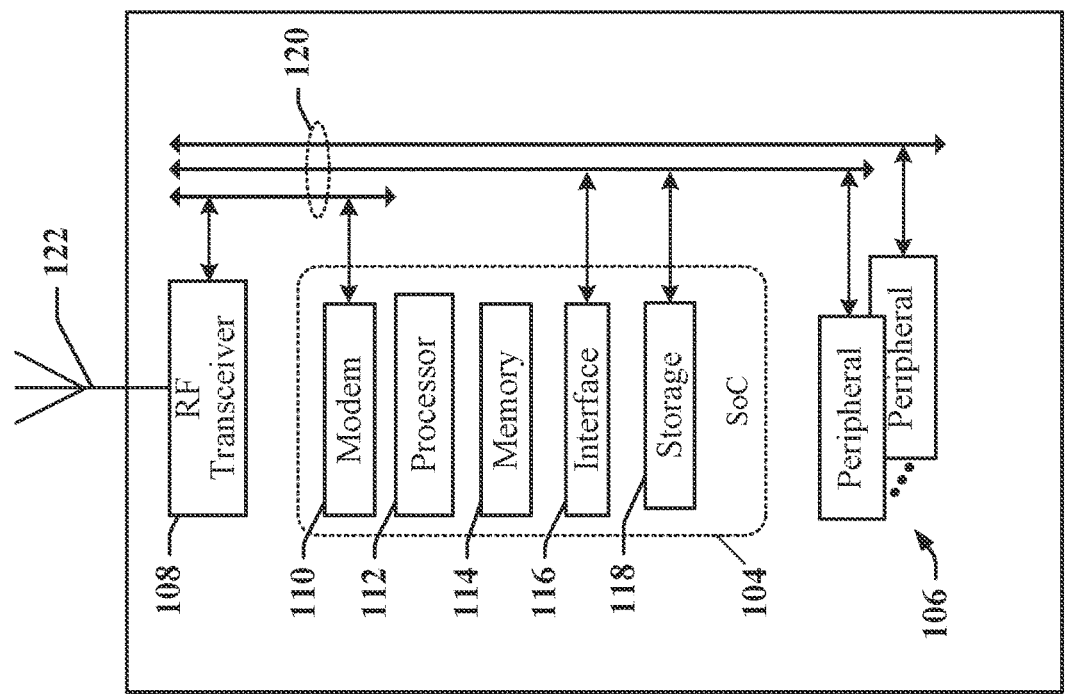
FIG. 1 illustrates an apparatus that can be implemented as an integrated circuit device including multiple components connected by interconnects according to some aspects of the disclosure.

FIG. 1 illustrates an example of an apparatus 100 that may be implemented as an integrated circuit device including multiple components (e.g., chiplets) connected by interconnects. In some examples, the apparatus may be enclosed within a portable or a wearable device, such as a smartwatch or a mobile device (e.g., smartphone, mobile phone, etc.). In some aspects, the apparatus 100 includes various circuitry. In various examples, the circuitry can be implemented using one or more dies or chiplets arranged in a configuration that can be adapted for use in mobile computing, embedded computing, edge computing, etc. In one example, the apparatus 100 may be configured to support multiple communication technologies, modes, or protocols. In some aspects, the apparatus 100 can include a system-on-chip (SoC) 104, one or more peripheral devices 106, and a transceiver 108 that cooperate to enable the apparatus to communicate through an antenna 122 with a radio access network, a core access network, the Internet, and/or another network.

In some aspects, the SoC 104 may include various circuitry, for example, one or more processors 112, one or more modems 110, on-board memory 114, a bus interface circuit 116, and/or other logic circuits or functions. The SoC can be controlled by an operating system that provides an application programming interface (API) layer that enables the one or more processors 112 to execute software modules residing in the on-board memory 114 or other processor-readable storage 118 provided on the SoC. The software modules may include instructions and data stored in the on-board memory 114 and/or processor-readable storage 118. The SoC 104 may access its on-board memory 114, the processor-readable storage 118, and/or storage external to the apparatus 100. The on-board memory 114 and the processor-readable storage 118 may include read-only memory (ROM), random-access memory (RAM), electrically erasable programmable ROM (EEPROM), flash memory, or any memory device that can be used in processing systems and computing platforms. The apparatus may include, implement, or have access to a local database or other parameter storage that can maintain operational parameters and other information used to configure and operate the apparatus 100 and/or the SoC 104. The local database may be implemented using registers, a database module, flash memory, magnetic media, EEPROM, soft or hard disk, or the like. The SoC 104 may also be operably coupled to external devices such as the antenna 122, a display, operator controls, switches or buttons, among other components.

The apparatus 100 may provide an interconnect (e.g., link 120) that enables communication between different components (e.g., SoC 104, peripheral 106, and/or 108 RF transceiver) that can be implemented in one or more dies (e.g., chiplets). In one example, the SoC 104 may include communication interface circuits 116 coupled to the interconnect. Each of the interface circuits 116 may include a combination of circuits, counters, timers, control logic and other configurable circuits or modules. In one example, certain interconnect interface circuits 116 may be configured to operate in accordance with standards-defined communication specifications or protocols. The apparatus 100 may include or control a power management function that configures and manages the operation of the apparatus 100.

In some aspects, the apparatus 100 may be included in mobile phones, tablet computers, palmtop computers, portable digital assistants (PDAs), portable game consoles, tablets, and other portable electronic devices. The various dies (e.g., chiplets) of the apparatus 100 may communicate with each other via one or more intra-chip communication interconnects. The apparatus 100 can be packaged in an integrated circuit (IC) package, which may be referred to as a "semiconductor package" or "chip package." The IC package typically includes a package substrate and one or more IC chips, dies, chiplets, or other electronic modules mounted to the package substrate to provide electrical connectivity to the IC chips, dies, or chiplets. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, and process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs. Design rules for newer process technology that use low-voltage transistors may preclude the use of higher voltage transistors supported by previous process technology generations. The unavailability of certain higher-voltage transistors may present an impediment to circuit designers for IC devices that include multiple voltage domains.

Figure 2:
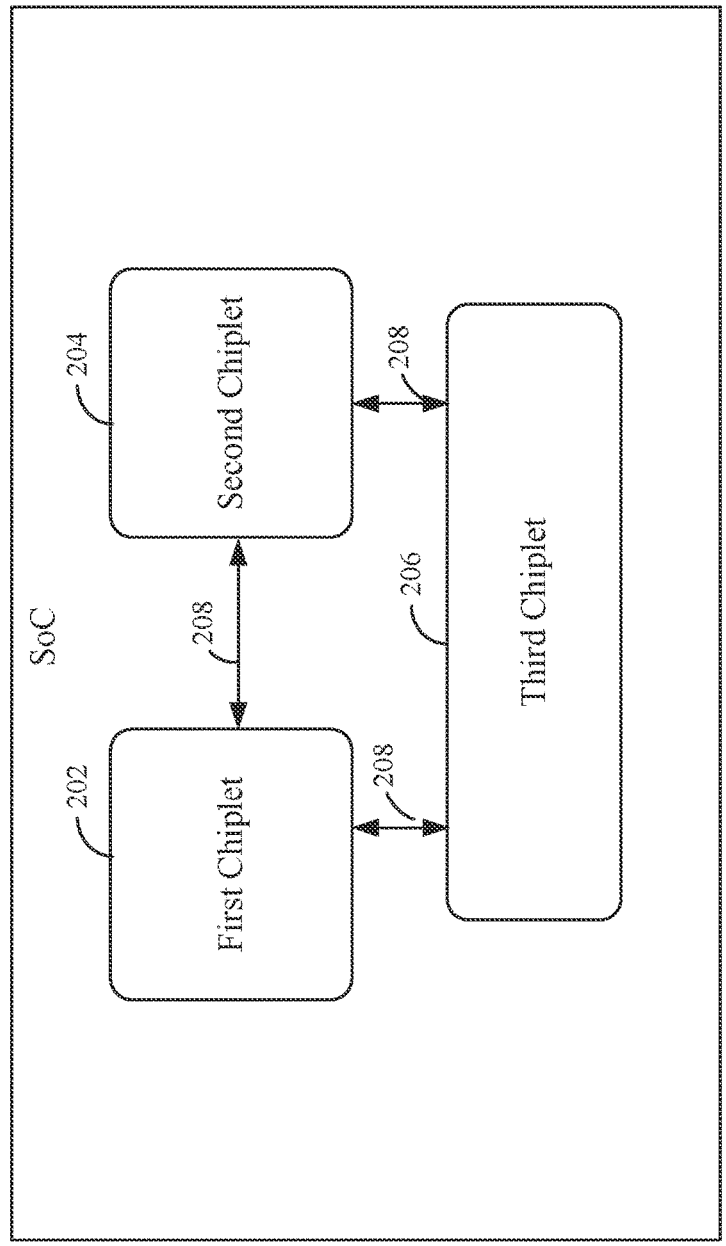
FIG. 2 illustrates certain aspects of an apparatus that can be constructed using chiplets according to some aspects of the disclosure.

In some aspects, chiplet technology can be used to address some of the performance, power, and size design requirements for complex SoCs used in certain mobile or wearable devices. The block diagram in FIG. 2 illustrates certain aspects of an SoC 200 that can be constructed using chiplets according to some aspects. In one example, the SoC 200 may be the SoC 104 of FIG. 1. The SoC 200 may be configured by selecting a combination of chiplets that implement certain subsystems or distinct functional elements. In the illustrated example, the SoC 200 may include multiple chiplets, for example, a first chiplet 202, a second chiplet 204, and a third chiplet 206 that are connected to each other via an interconnect 208. In other examples, the SoC 200 may include fewer or more chiplets than those shown in FIG. 2. The chiplets can be used to provide various subsystems or functions of the SoC. In some aspects, the interconnect 208 can be a Universal Chiplet Interconnect express (UCIe) link, and two chiplets connected by a UCIe link can be referred as a UCIe module and a UCIe module partner, respectively.

In some aspects, the SoC 200 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets (e.g., chiplets 202, 204, and 206). The chiplets included in the SoC 200 can be proprietary or may be acquired from a variety of sources. An SoC may be constructed from chiplets manufactured at different process nodes, operated at different voltages, and/or operated at frequencies.

Figure 3:
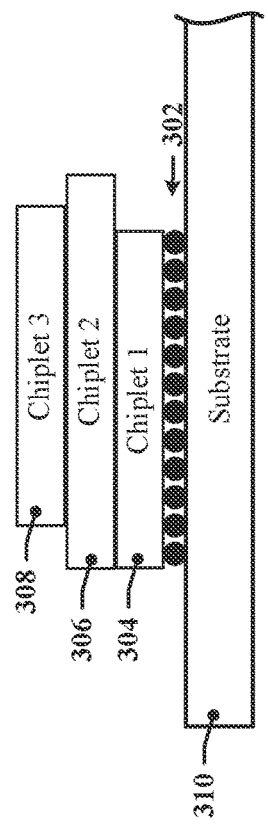
FIG. 3 illustrates an exemplary apparatus in which multiple chiplets are stacked vertically on a substrate according to some aspects of the disclosure.

FIG. 3 illustrates an example of an SoC 300 in which three exemplary chiplets 304, 306, 308 are stacked on a substrate 310. In other examples, some chiplets can be included in stacks that are deployed across the surface of the substrate 310, while other chiplets may be individually mounted on the surface of the substrate 310. In some aspects, chiplets may be mounted on the surface of the substrate using solder balls 302 (e.g., flip chip bumps) that provide electrical and/or thermal coupling between the substrate 310 and the mounted chiplets 304, 306, and 308. An interconnect structure (e.g., UCIe) may be formed that enables the chiplets 304, 306, 308 (e.g., in a stack of chiplets) to communicate with one another, with other chiplets mounted on the substrate 310, and with input/output structures that connect the SoC 300 with other circuits, displays, imaging sensors, and other peripherals within an apparatus. In some examples, the SoC 300 may be any of the SoCs described above in FIGS. 1 and 2.

The use of chiplets can reduce the areal size of the substrate 310 and increase three-dimensional packing density. The constituent chiplets may provide complex features and high performance within a smaller form-factor operated at lower power specifications. Moreover, each chiplet may define multiple power domains, operate at different frequencies, and different chiplets may manage power/frequency modes independently and. In some instances, two or more chiplets may be operated in mutually exclusive power states. Additionally, operating conditions for an SoC depend on the type, number, and arrangement of chiplets included on the substrate in addition to the modes of operation defined by applications. It is necessary to consider power usage by all chiplets in the SoC in order to ensure compliance with power budgets assigned for an application or device.

The interconnect or communication link between various chiplets or dies can use a layered protocol. One example of such protocol is the UCIe protocol. Hereafter, aspects of the present disclosure will be presented using an UCIe link and protocol. However, the present disclosure is not limited to the UCIe link and protocol. In other examples, aspects of the disclosure can be implemented using any suitable interconnects and protocols.

Figure 4:
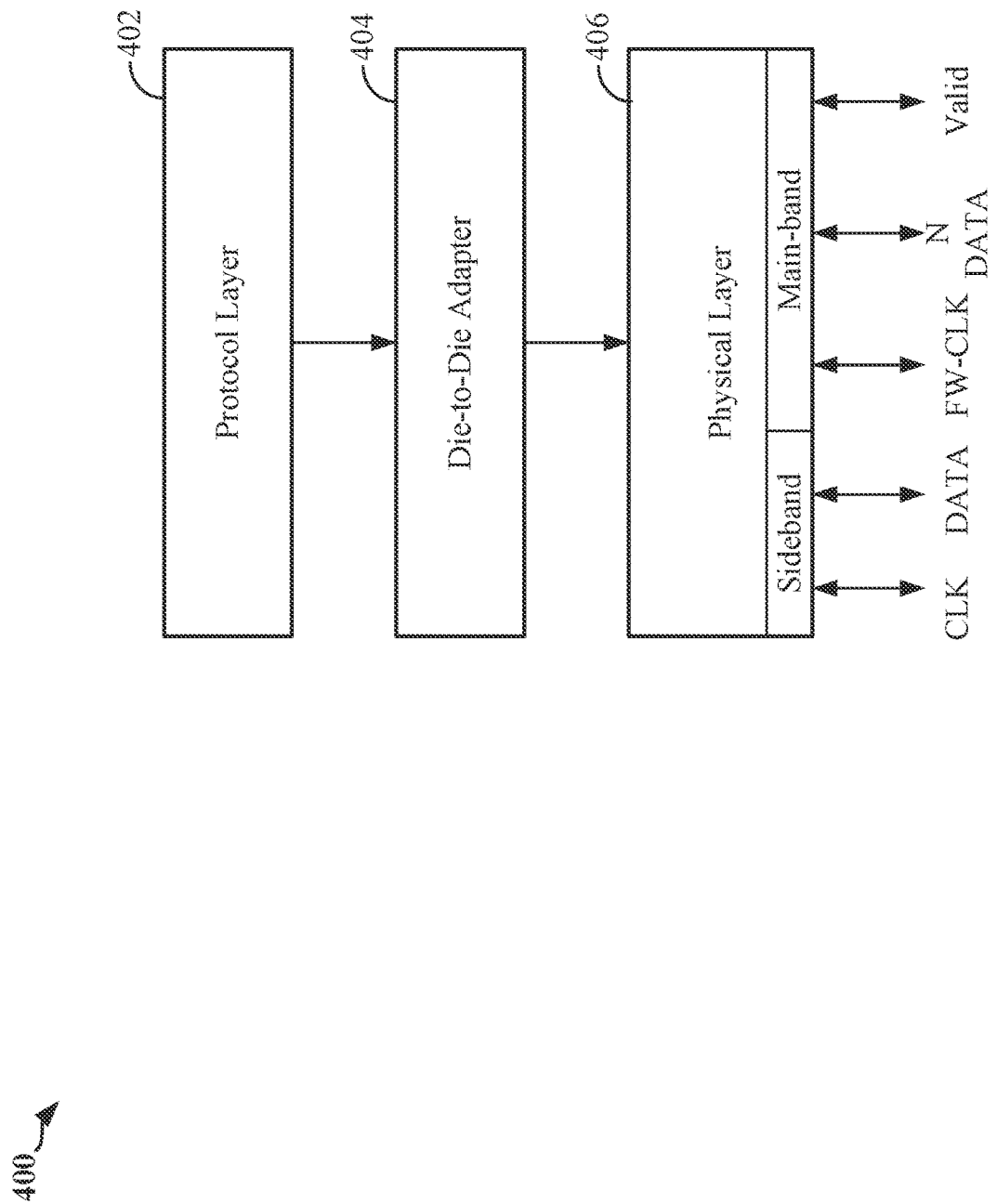
FIG. 4 illustrates three exemplary Universal Chiplet Interconnect express (UCIe) protocol layers according to some aspects of the disclosure.

FIG. 4 illustrates an exemplary UCIe protocol stack 400 according to some aspects of the disclosure. The protocol stack 400 includes a protocol layer 402, a die-to-die (D2D) adapter layer 404, and a physical layer 406. The protocol layer may be application specific. For example, the protocol layer 402 may support Peripheral Component Interconnect Express (PCIe), Compute Express Link (CXL), etc. The D2D adapter layer 404 coordinates with the protocol layer 402 and the physical layer 406 to ensure successful data transfer across the UCIe link. The D2D adapter layer 404 is responsible for coordinating higher level link state machine and bring up, protocol options related parameter exchanges with remote link partner, and when supported, power management coordination with remote link partner.

A UCIe link's main data path can be organized as a group of lanes called a module. A given instance of protocol layer 402 or D2D adapter 406 can send data over one or more modules. The physical link of the UCIe link includes a sideband connection and a main-band connection. FIG. 4 illustrates the sideband and main-band of an exemplary module. The sideband is used for parameter exchanges, register accesses for debug/compliance, and coordination with the remote partner for link training and management. The sideband includes a forwarded clock pin (CLK) and a data pin (DATA) in each direction. Each module has its own set of sideband pins (CLK and DATA). In some aspects, a redundant pair of clock and data pins in each direction is provided for repair of the sideband. The main-band connection constitutes the main data path of a UCIe link. Each module consists of a forwarded clock (FW-CLK), a data valid pin (Valid), and N lanes of data (N DATA) per module. In some aspects, a module may include 64 lanes (N=64, also referred to as x64) in the main-band.

In some aspects, a UCIe link can provide lane redundancy. For example, a UCIe advance package interface can support redundancy remapping to recover from faulty lanes. Each clock and track lane and redundant clock and track lane can be independently checked to detect possible electrical opens or electrical shorts between the two clock pins. Single-ended clock receivers or independent detection mechanism may be used to ensure clock repair.

During link initialization and training. UCIe devices (UCIe module partners) establish a reliable communication link between the devices connected via a UCIe link. The UCIe devices negotiate and configure various parameters to ensure proper communication and data transfer. In some aspects, the Link Training and Status State Machine (LT-SSM) governs the initialization and training of the UCIe link. The LTSSM transitions through various states until it reaches the active state, indicating a successfully initialized and trained link between the devices. During link initialization and training, the UCIe devices can negotiate and agree upon the link width and speed based on their capabilities. Once the link initialization and training process is completed, the UCIe devices can start exchanging data using the established and configured communication link.

Figure 5:
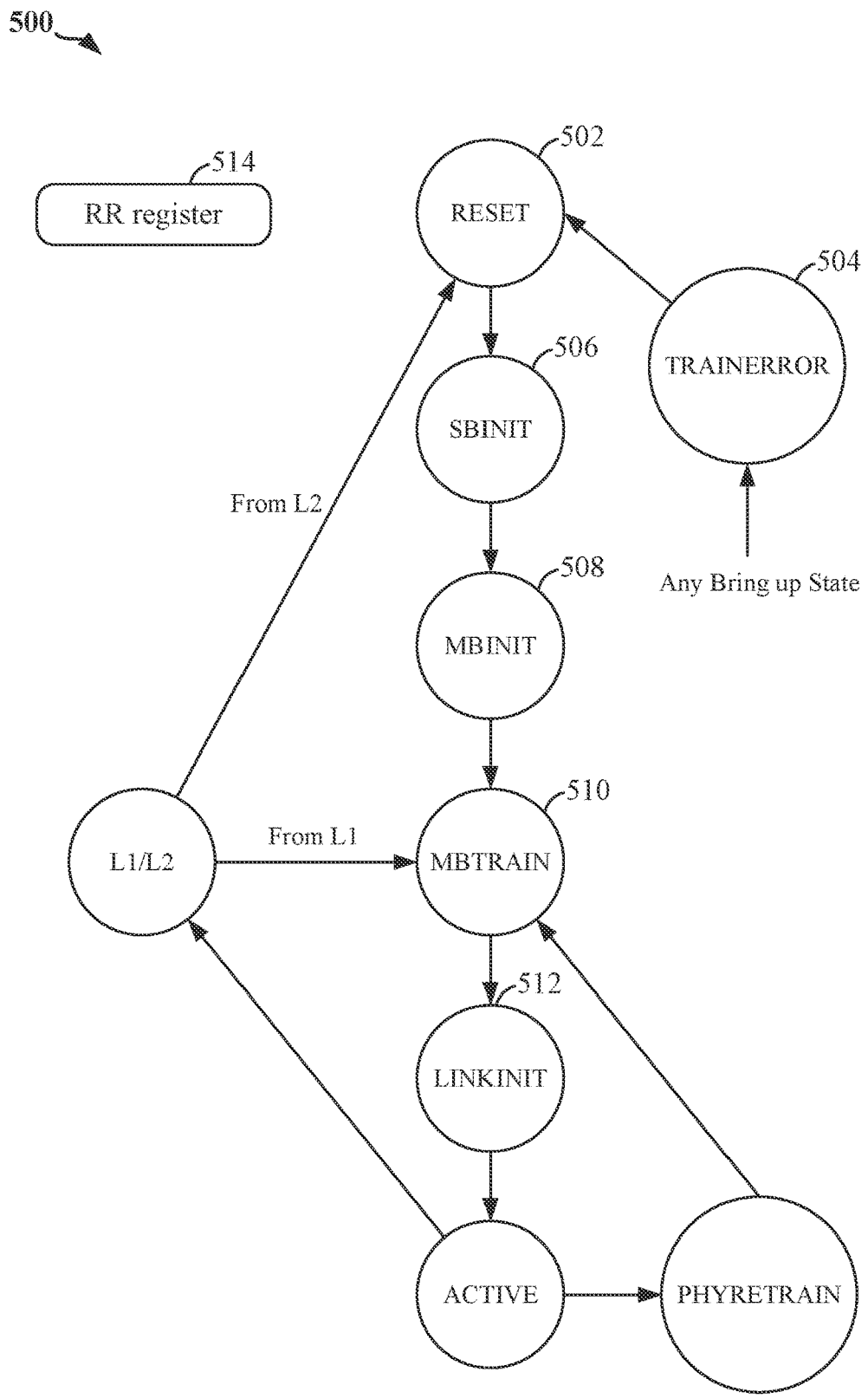
FIG. 5 a diagram illustrating an exemplary Link Training and Status State Machine (LTSSM) according to some aspects of the disclosure.

FIG. 5 is a diagram illustrating exemplary states of a LTSSM 500 according to some aspects of the disclosure. RESET 502 is the state following primary reset or exit from TRAINERROR 504. SBINIT 506 is the sideband initialization state where the sideband can be detected, repaired (when applicable), and initialized. MBINIT 508 is a main-band initialization state where main-band (MB) initialization occurs, following sideband initialization in SBINIT. The MB can be initialized at the lowest speed. In MBINIT, the dies (e.g., chiplets) can perform on die calibration followed by interconnect repair (when applicable). In MBTRAIN 510 (main-band training state), the main-band (data, clock and track, and valid signals) speed of operation can be set to the highest negotiated data rate between link partners. In MBTRAIN, die-to-die training of the main-band can be performed to center the clock with respect to data. LINKINIT 512 is the state used to exchange adapter and link management messages. ACTIVE is the state in which transactions can be sent and received between link partners.

L1/L2 is the power management state. PHYRETRAIN is the state used to begin the retrain flow for the link during runtime.

A linkerror refers to a problem or error that occurs at the physical layer of the UCIe interconnect. It indicates a failure or disruption in the communication link between two components (e.g., chiplets or dies) connected through the UCIe link. This can be caused by various factors such as electrical noise, signal integrity issues, timing mismatches, or physical defects in the interconnect itself. A linkerror indicates that the communication channel is not functioning properly and may require troubleshooting or repair. On the other hand, a trainerror is usually related to the process of training or configuring the interconnect for optimal performance. A trainerror indicates that the training process was unsuccessful or encountered an error. It may be caused by issues with signal integrity, channel conditions, or compatibility between the transmitting and receiving components. In summary, linkerror typically refers to a physical layer issue in the interconnect, indicating a problem with the communication link, while trainerror relates to the training process and suggests difficulties in configuring the interconnect for optimal performance. In some aspects, a redundant_recovery (RR) register 514 can be set to different values to identify the cause of link retraining (e.g., due to trainerror/linkerror or not).

The TRAINERROR state is used as a transitional state due to any fatal or non-fatal events (e.g., linkerror or trainerror) that need to bring the state machine back to RESET state. Fatal events are severe errors that can result in the termination of the current transaction or the entire UCIe link. A fatal event cannot be recovered or corrected by the UCIe devices. When a fatal event occurs, the affected device or link may be disabled or reset to recover from the error state. Non-fatal events are less severe than fatal events and can often be recovered or corrected without terminating the entire UCIe link or transaction. For example, non-fatal errors can be addressed by retrying the operation or taking corrective actions.

In some aspects, the TRAINERROR state is entered from SBINIT when the sideband interface needs to be repaired and from MBINIT when the main-band interface needs to be degraded (i.e., reducing link width) or repaired. If sideband is active, a sideband handshake is performed for both devices (e.g., UCIe module and UCIe module partner) to enter TRAINERROR state from any state other than SBINIT. From TRAINERROR, the link can go through initialization and training states (SBINIT and MBINIT) again to repair and/or retrain the link if possible or needed.

In the current UCIe specification, various redundant lanes can be provided for lane repair for the sideband and the main-band. For example, redundant data lanes (TRD_P[0:3]), a redundant clock lane (TCKRD_L) and a redundant valid lane (TRDVLD_L) may be provided for lane repair in the main-band. Once a link is initialized and is up, the redundant data lanes can be tri-stated or put to low power mode. Similarly, a redundant pair of TX and associated clock line may be provided in the sideband (TXDATASBRD and TXCKSBRD).

During link retraining, the sideband can be reinitialized as part of the SBINIT state even when link retraining is caused by scenarios other than trainerror or linkerror exit from TRAINERROR, for example, L2 exit, Reset, etc. Similarly, during every link retraining, the complete main-band is reinitialized as part of the MBINIT state even when link retraining is caused by scenarios other than trainerror or linkerror exit from TRAINERROR, for example, L2 exit, Reset, etc. In one example, other than TRAINERROR exit, if the link experiences errors such as CRC (cyclic redundancy check) errors, link integrity failures, or other signaling issues, it may initiate link retraining to diagnose and rectify the problem. In another example, other than TRAINERROR exit, a link reset can be triggered by software or hardware actions, such as a system reset, power management events, or specific control signals. After a link reset, retraining is typically performed to establish a stable and reliable connection. In another example, other than TRAINERROR exit, if there are changes to the link configuration, such as modifying the link speed, width, or other parameters, link retraining may be required to adapt the link to the new settings.

When the main-band is reinitialized, even when clock repair pattern and valid repair pattern are successfully acknowledged on the Clock and Valid lanes, iterations (e.g., 128 iterations) of clock and valid repair pattern can be sent on the lanes including the redundant lanes (e.g., TCKRD_L and TRDVLD_L respectively). Similarly, in the SBINIT state, iterations of clock pattern can be sent on the redundant TX lane. However, the redundant lanes are not needed until a trainerror or linkerror occurs, therefore reinitializing the redundant lanes in every retrain cycle becomes an overhead. For example, including the redundant lanes in every retrain cycle, adds latencies to the link retraining process and increases power consumption significantly.

Aspects of the present disclosure provides various techniques to reduce the latencies and/or power consumption in UCIe link retraining. In some aspects, the UCIe LTSSM can be configured to identify whether link retraining (e.g., link training in SBINIT and MBINIT) is initiated as part of a trainerror/linkerror (from TRAINERROR 504) exit or not. In some aspects, a UCIe device can have a redundant_recovery (RR) register (e.g., RR register 514 of FIG. 5) that can be set to different values to identify the cause of link retraining (e.g., due to trainerror/linkerror or not). The value of the RR register can control and adapt the processes in the SBINIT and/or MBINIT states to reduce latency and/or power consumption of link training. For example, depending on the values of the RR register, link training can skip certain substrates in SBINIT and/or MBINIT for the redundant lanes. For example, the LTSSM can only reinitialize the functional lanes of the main-band and active data clock pair in the sideband. By skipping the redundant lanes when lane training is not caused by trainerror/linkerror, the LTSSM can save the overhead of sending a clock/valid data pattern on the redundant lines and can save power significantly.

Figure 6:
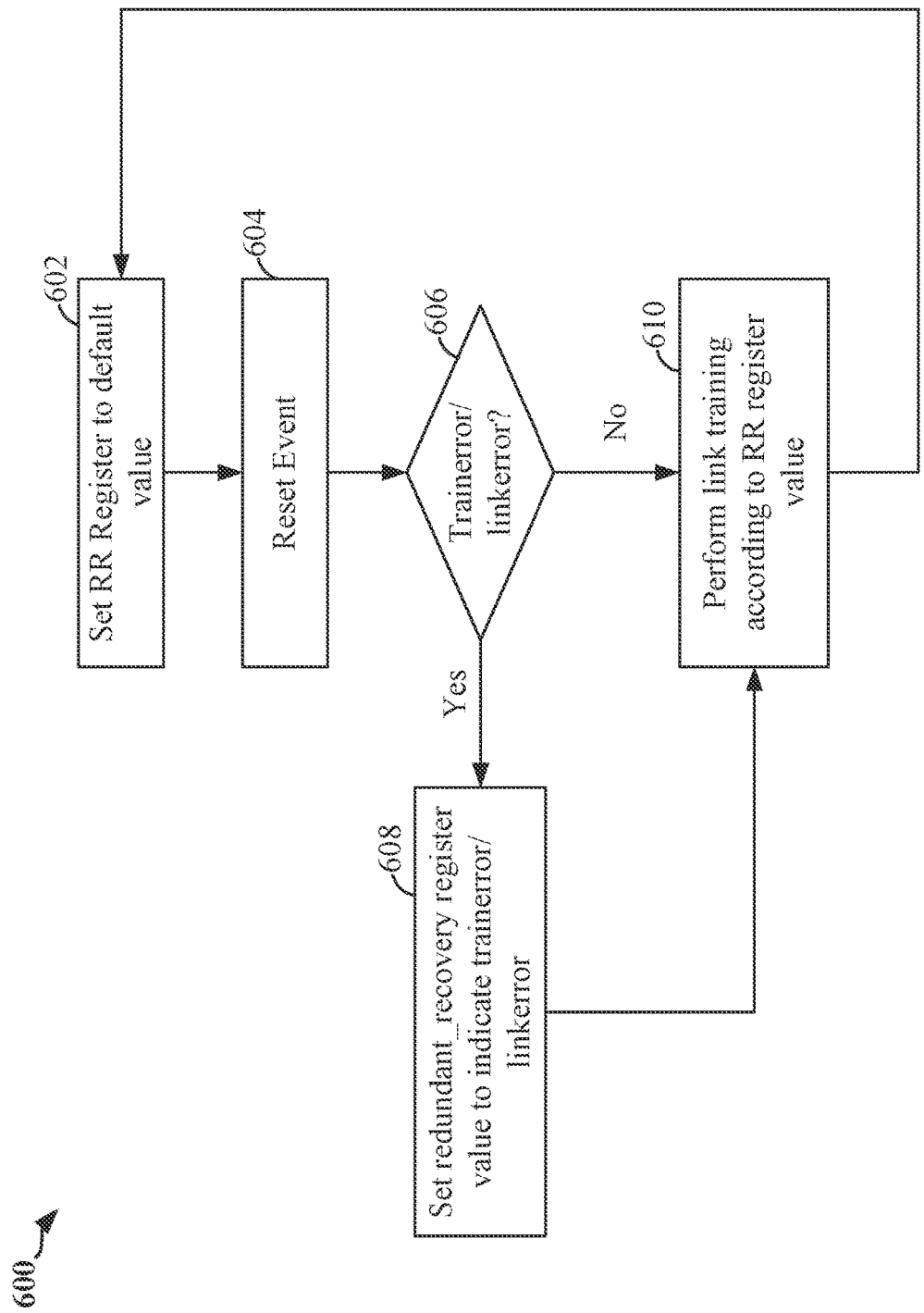
FIG. 6 is a flow chart illustrating the use a redundant_recovery (RR) register to control a link retraining process according to some aspects of the disclosure.

FIG. 6 is a flow chart illustrating the use of a redundant_recovery (RR) register (RR register 514 of FIG. 5) to control a link retraining process according to some aspects of the disclosure. Link retraining of a UCIe link can be invoked for various reasons. For example, link retraining can be caused by the occurrence of a linkerror/trainerror or other reasons. At 602, the UCIe device (e.g., UCIe module) can set the RR register to a default value (e.g., 0b) that indicates that link retraining is not caused by linkerror and trainerror. At 604, the UCIe device can enter link reset (e.g., reset 502 of FIG. 5). At 606, the UCIe device determines whether the UCIe link has entered trainerror/linkerror and that link retraining will be caused by the linkerror and/or trainerror. At 608, the UCIe device can set the RR register to a first value (e.g., 1 binary (1b)) to indicate entry to linkerror/trainerror and hence that link retraining is caused by linkerror and/or trainerror. In some aspects, the RR register may be implemented in the memory 114 and/or storage 118 of an SoC 104 (see FIG. 1). At 610, the UCIe device can perform link training based on the value of the RR register, for example, as described in FIGS. 7 and 8 below. After link training, the UCIe device can set the value of the RR register back to the default value (e.g., 0b) at block 602.

Figure 7:
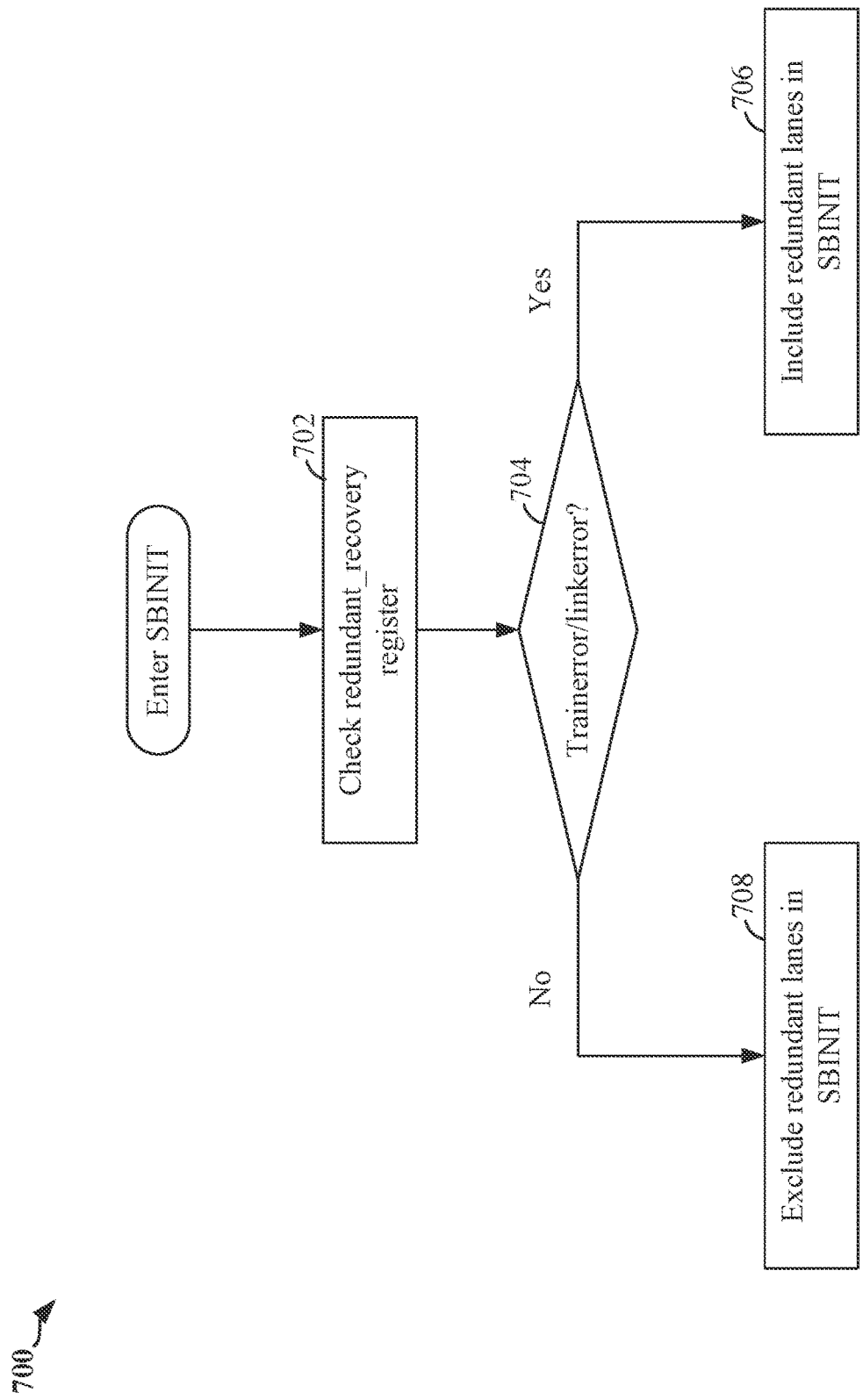
FIG. 7 is a flow chart illustrating a sideband retraining process based on the value of the RR register according to some aspects of the disclosure.

FIG. 7 is a flow chart illustrating a sideband retraining process 700 based on the value of a redundant_recovery register according to some aspects of the disclosure. In one example, the apparatus 100 can use this process in the SBINIT state of a UCIe link retraining process. At 702, in SBINIT state, the apparatus can check the value of the redundant_recovery register (e.g., RR register 606). At 704, based on the value of the register, the apparatus can determine whether or not link training is involved due to linkerror and/or trainerror. At 706, if link training is invoked due to trainerror and/or linkerror, the apparatus can initialize and train all lanes including the redundant lanes (e.g., redundant data and associated clock line in sideband) as part of SBINIT. For example, the apparatus can use a SBINIT pattern (e.g., two consecutive iterations of 64 unit interval (UI) clock pattern and 32 UI low voltage) to train the sideband lanes. At 708, if link training is not invoked due to trainerror and/or linkerror, the apparatus can initialize and train the lanes of the sideband but excluding the redundant lanes (e.g., redundant pair of TX and associated clock line in sideband) as part of SBINIT. For example, the apparatus can skip one or more substrates in SBINIT corresponding to the redundant lanes.

Figure 8:
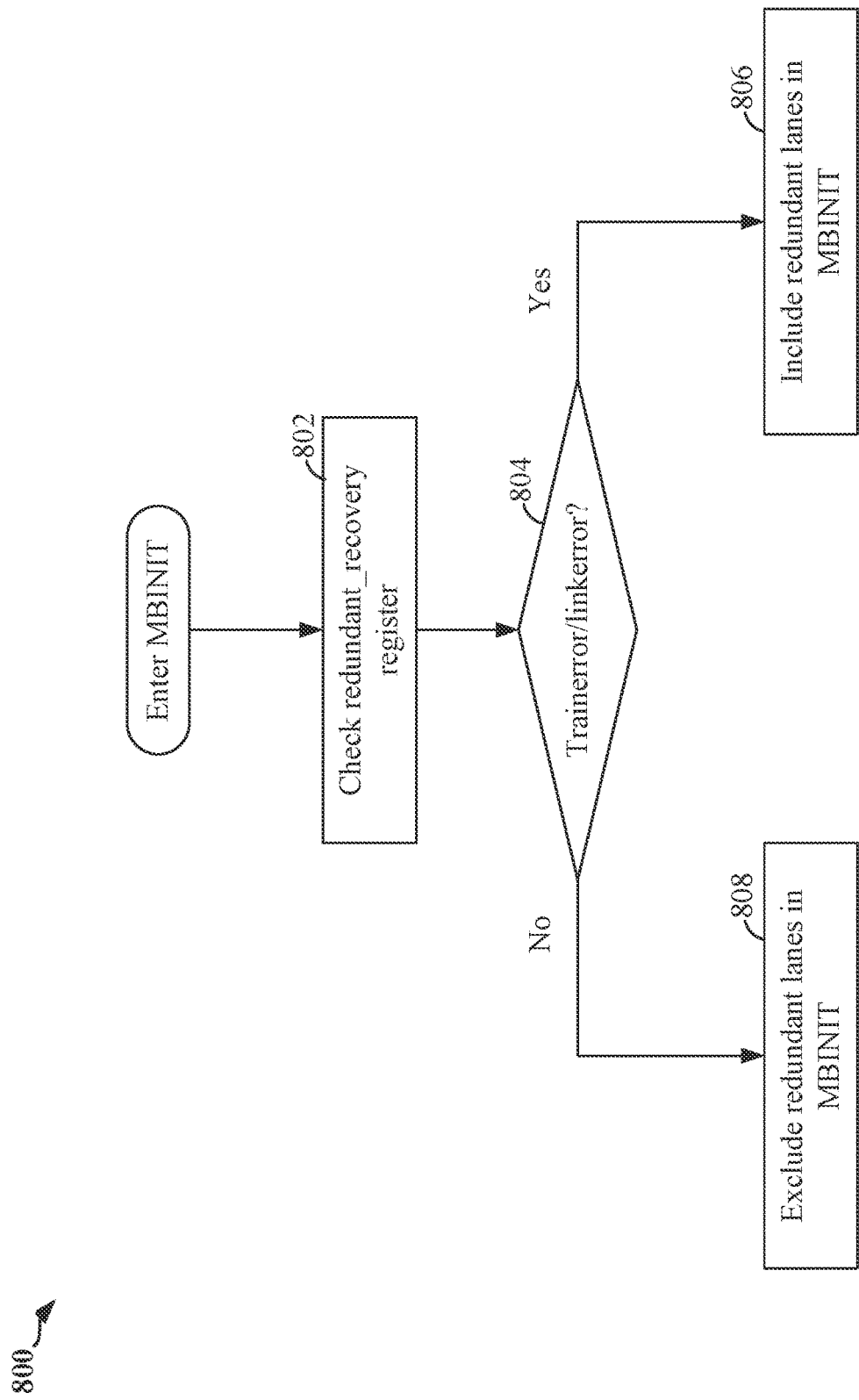
FIG. 8 is a flow chart illustrating a main-band training process based on the value of the RR register according to some aspects of the disclosure.

FIG. 8 is a flow chart illustrating a main-band training process 800 based on the value of a redundant_recovery register according to some aspects of the disclosure. In one example, the apparatus 100 can use this process in the MBINIT state of a UCIe link retraining process. At 802, in MBINIT state, the apparatus can check the value of the redundant_recovery register (e.g., RR register 606). At 804, based on the value of the redundant_recovery register, the apparatus can determine whether or not link training is involved due to linkerror and/or trainerror (e.g., exit from TRAINERROR). At 806, if link training is invoked due to trainerror and/or linkerror, the apparatus can initialize and train all lanes including the redundant lanes (e.g., four redundant data lanes, a redundant clock lane, and a redundant valid lane) as part of MBINIT. For example, the apparatus can use a MBINIT pattern (e.g., 128 iterations of clock and valid repair pattern) to train the main-band lanes. At 808, if link training is not invoked due to trainerror and linkerror, the apparatus can initialize and train the lanes of the main-band but excluding the redundant lanes as part of MBINIT. For example, the apparatus can skip one or more substrates in MBINIT entirely or perform the substrates while excluding the redundant lanes.

Figure 9:
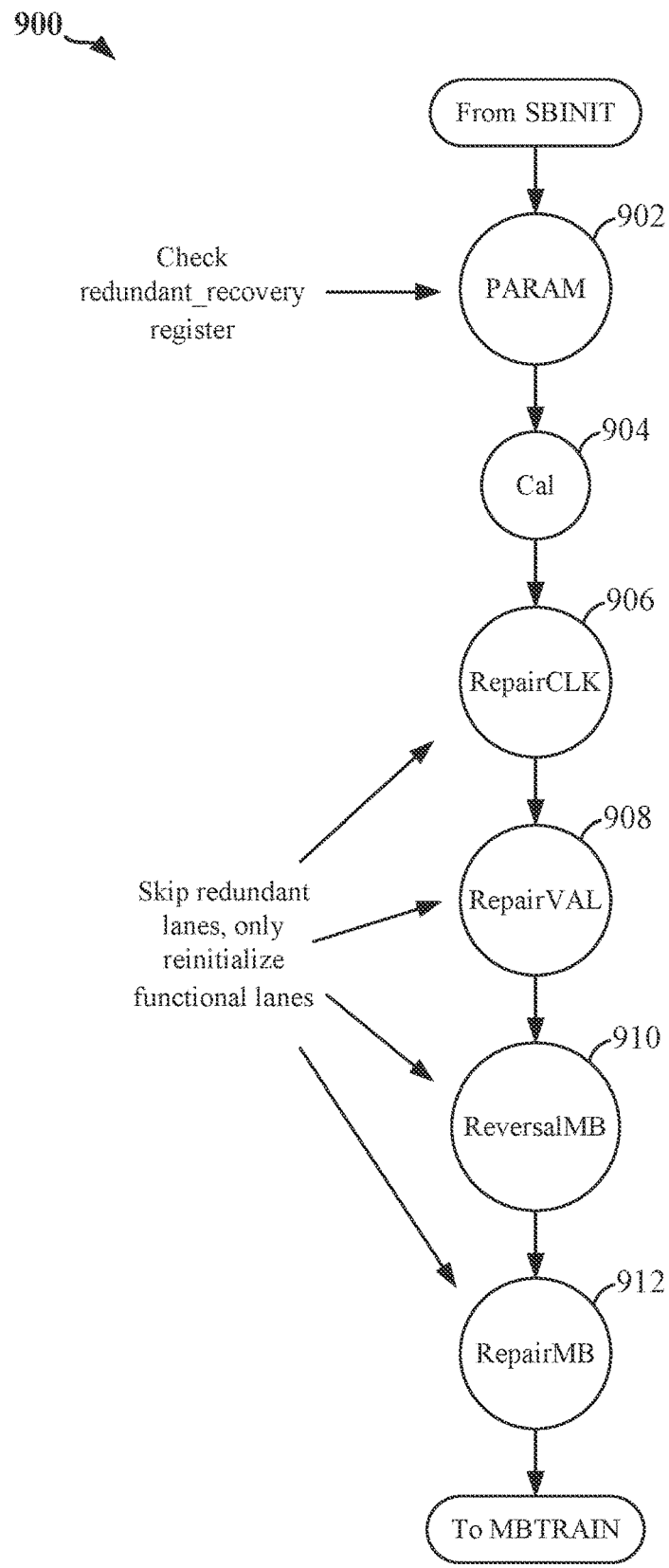
FIG. 9 is a diagram illustrating a first process of excluding redundant lanes during link initialization according to some aspects of the disclosure.

FIG. 9 is a diagram illustrating a process of excluding redundant lanes in the MBINIT state according to some aspects of the disclosure. As described above in relation to FIGS. 7 and 8, the redundant main-band lanes can be excluded from being reinitialized and trained in MBINIT if it was not invoked due to trainerror and linkerror. Therefore, the process can save the overhead of sending clock/valid data pattern on the redundant lanes and reduce power consumption significantly. The MBINIT state includes a number of substrates, for example, PARAM 902, Cal 904, RepairCLK 906, RepairVAL 908, ReversalMB 910, and RepairMB 912.

The PARAM state can be used to perform exchange of parameters for setting up the negotiated speed (e.g., maximum speed) and other PHY settings. The Cal state can be used to perform calibration of the lanes as needed (e.g., Tx duty cycle correction, receiver offset, and reference voltage Vref calibration). The RepairCLK state can be used to detect and apply repair (if needed) to clock and track lanes. In the RepairVAL state, the UCIe device (e.g., a UCIe module) can set the clock phase at the center of the data UI on its main-band transmitter. The ReversalMB state is entered if Clock and Valid lanes are functional. In this state, data lane reversal is detected. The RepairMB state is entered after lane reversal detection and application is successful. In this state, the main-band lanes can be detected and repaired if needed.

In some aspects, the UCIe device can check the redundant_recovery register in the PARAM 902 substrate to determine whether or not MBINIT is invoked due to trainerror and/or linkerror. For example, the redundant_recovery register may have a specific value (e.g., 1b) if the UCIe link went to trainerror/linkerror; otherwise, the redundant_recovery register may have a default value (e.g., 0b). Then, based on the value of the redundant_recovery register, the UCIe device can selectively skip the redundant lanes in each of RepairCLK 906, RepairVAL 908, ReversalMB 910, and RepairMB 912 MBINIT substrates. In this case, the UCIe device can reinitialize the functional lanes part (e.g., x64 lanes) of the main-band in these MBINIT substrates while excluding the redundant lanes.

Figure 10:
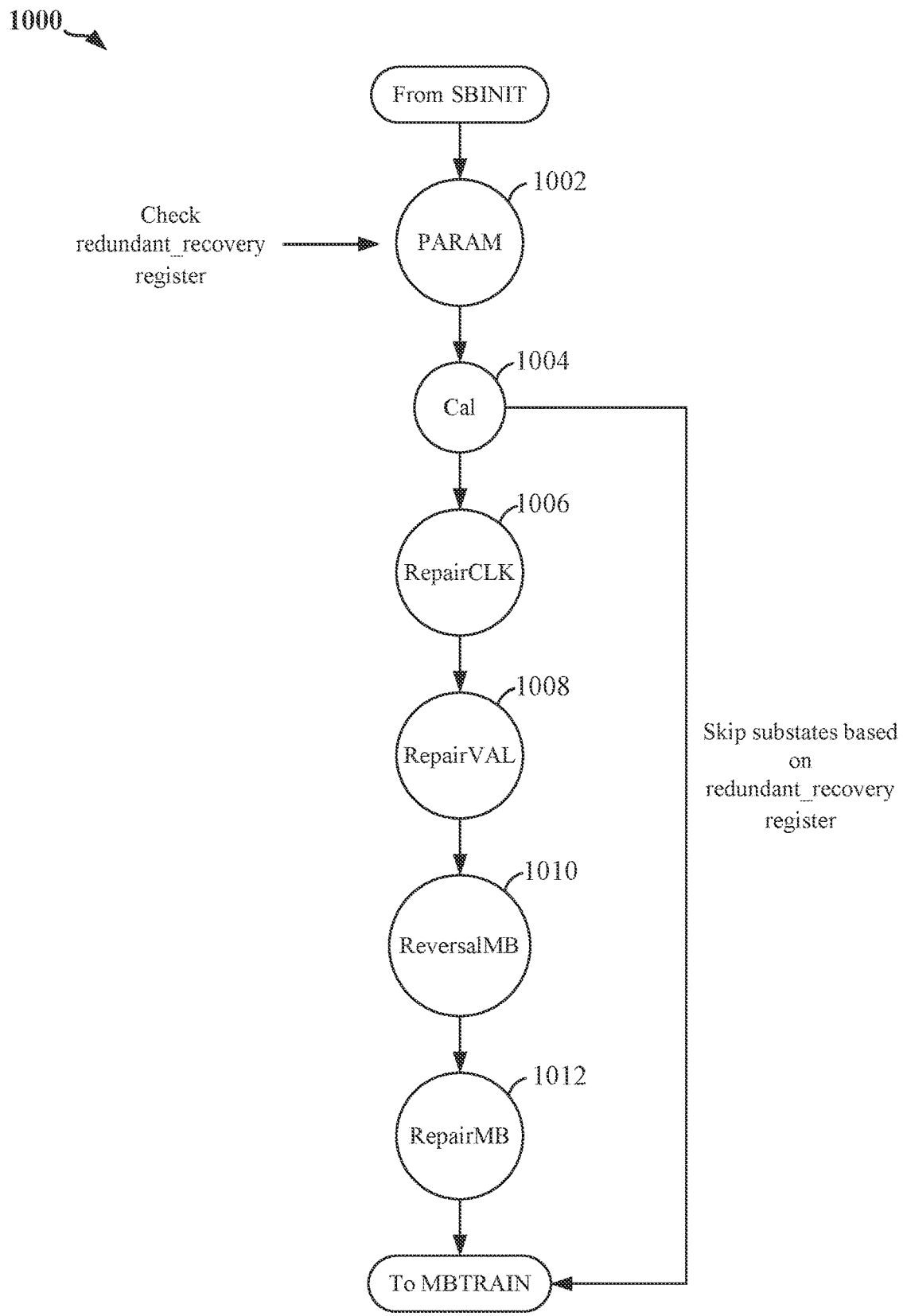
FIG. 10 is a diagram illustrating a second process of excluding redundant lanes during link initialization according to some aspects of the disclosure.

FIG. 10 is a diagram illustrating another process of excluding redundant lanes in the MBINIT state according to some aspects of the disclosure. As described above in relation to FIGS. 7 and 8, the redundant main-band lanes can be excluded from being reinitialized and trained in MBINIT if this state was not invoked due to trainerror and linkerror. Therefore, the process can save the overhead of sending clock and valid data patterns on the redundant lines and thus reducing power consumption significantly. The MBINIT state includes a number of substrates, for example, PARAM 1002, Cal 1004, RepairCLK 1006, RepairVAL 1008, ReversalMB 1010, and RepairMB 1012.

In some aspects, the UCIe device can check the redundant_recovery register in the PARAM substrate to determine whether or not MBINIT is invoked due to trainerror and/or linkerror. For example, the redundant_recovery register may have a specific value (e.g., 1b) if the UCIe link went to trainerror and/or linkerror; otherwise, the redundant_recovery register may have a default value (e.g., 0b). Then, based on the value of the redundant_recovery register, the UCIe device can selectively skip the RepairCLK 1006, RepairVAL 1008, ReversalMB 1010, and RepairMB 1012 substrates of MBINIT. For example, the UCIe device can reinitialize the functional lanes part of the main-band in these MBINIT substrates without going through RepairCLK 1006, RepairVAL 1008, ReversalMB 1010, and RepairMB 1012 substrates.

Figure 11:
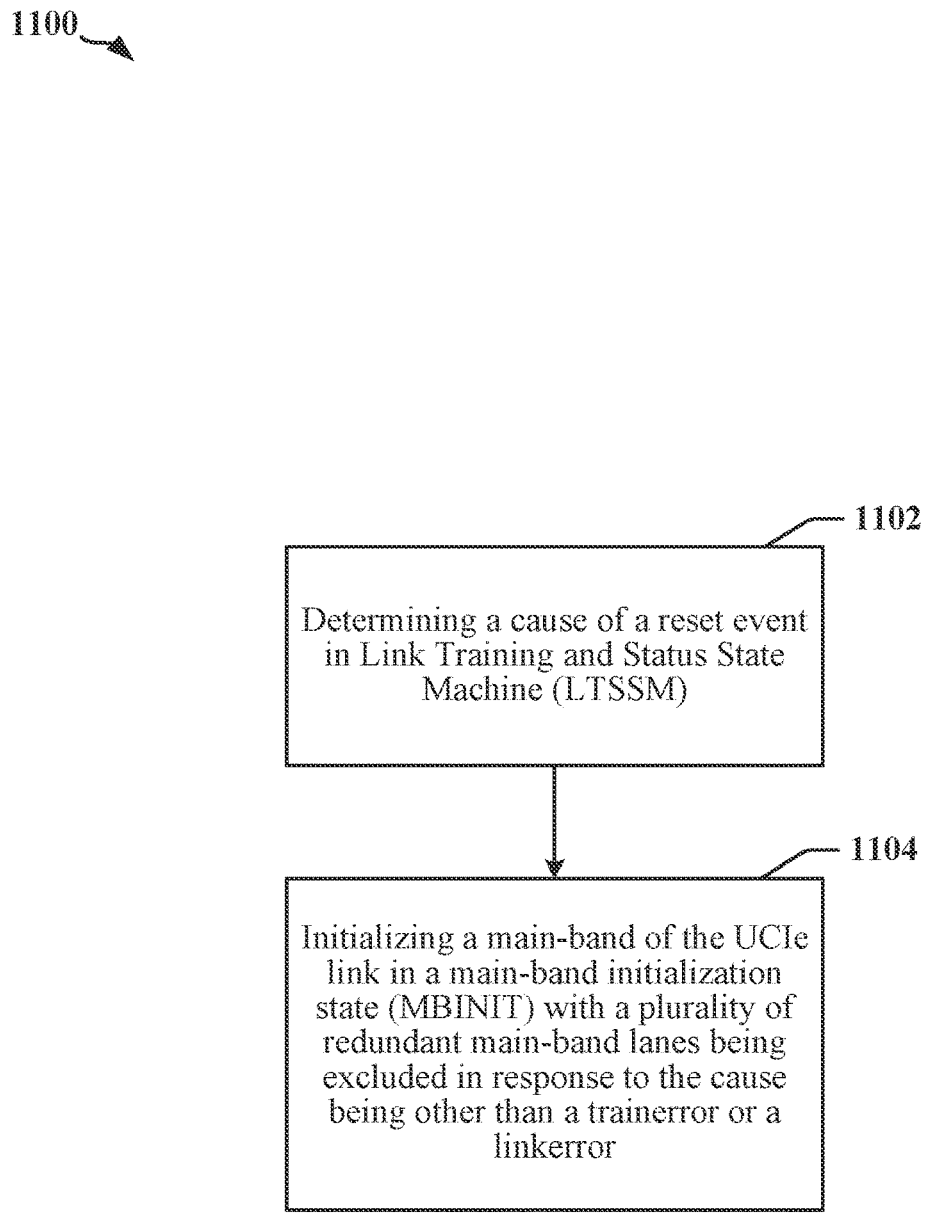
FIG. 11 is a flowchart illustrating a method for controlling a UCIe link using a LTSSM in accordance with some aspects of the disclosure.

FIG. 11 is a flow chart 1100 illustrating a method for controlling a UCIe link using a Link Training and Status State Machine (LTSSM) and a redundant_recovery (RR) register in accordance with certain aspects of this disclosure. In some instances, the method can be implemented using the apparatus 100 in a mobile communication device or any devices.

At 1102, the apparatus can determine a cause of a reset event in the LTSSM. In one example, the cause of the reset event (e.g., RESET 502 of FIG. 5) can be a trainerror or a linkerror (e.g., TRAINERROR state 504) as described above in relation to FIGS. 5-10. In this case, the LTSSM enters RESET 502 after exiting the TRAINERROR state 504. In other examples, the cause is not the trainerror or linkerror, and the LTSSM can enter the RESET state from other states (i.e., no trainerror and linkerror exit) instead of the TRAINERROR state. In some aspects, the apparatus can set value of the RR register as described above in FIG. 6 to indicate whether or not the reset is caused by trainerror and/or linkerror. For example, the apparatus can set the value of the RR register to 1b (a first value) if link reset is triggered due to entry into the TRAINERROR state (e.g., due to trainerror and/or linkerror); otherwise, the apparatus can set the value of the RR register to 0b (a second value) if link reset is not triggered due to trainerror and/or linkerror. At 1104, the apparatus can initialize a main-band of the UCIe link in a main-band initialization state (e.g., MBINIT 508 of FIG. 5) with a plurality of redundant main-band lanes excluded in response to the cause of reset other than the trainerror and/or linkerror.

In one aspect, the excluded plurality of redundant main-band lanes can include at least one of a redundant data lane, a redundant clock lane, or a redundant valid lane of the main-band. In one aspect, the apparatus can initialize a sideband of the UCIe link in a sideband initialization state (e.g., SBINIT 506 of FIG. 5) with a plurality of redundant sideband lanes being excluded based on the cause of the reset event. The excluded plurality of redundant sideband lanes can include at least one of a data line or a clock lane of the sideband. In one aspect, the apparatus can determine the cause of the reset event by checking a value of the RR register. The value of the RR register indicates whether the reset event has been caused by at least one of the trainerror or the linkerror of the UCIe link. The apparatus can set the value of the RR register to a first value (e.g., 1b) indicating the cause of the reset event being at least one of the trainerror or the linkerror. The apparatus can set the value of the RR register to a second value (e.g., 0b) indicating the cause of the reset event not being at least one of the trainerror or the linkerror. In one aspect, the apparatus can refrain from sending a clock and data pattern on the redundant lanes in response to the cause of the reset event not being the trainerror and the linkerror. In one aspect, the MBINIT state can include a plurality of substrates, and the apparatus can skip at least one or more of the plurality of substrates in response to the cause of the reset event other than the trainerror and the linkerror. In one aspect, the apparatus can skip the at least one or more of the plurality of substrates only for the redundant main-band lanes while still going through the substrates to initialize the main-band. For example, the substrates may include one or more of Repair-CLK, RepairVAL, ReversalMB, and RepairMB as described above in relation to FIGS. 9 and 10.

Some aspects of disclosure provide an apparatus configured to initialize a UCIe link using a LTSSM in accordance with certain aspects of this disclosure. In some instances, the apparatus includes means for determining a cause of a reset event in the LTSSM, the cause including at least one of a trainerror or a linkerror. For example, the processor 112 and/or the interface 116 can provide a means to determine the cause of the reset event. In some instances, the apparatus includes means for initializing a main-band of the UCIe link in a main-band initialization state (e.g., MBINIT 508 of FIG. 5) with a plurality of redundant main-band lanes being excluded in response to the cause of reset other than the trainerror and linkerror. For example, the processor 112 and/or the interface 116 can provide a means to initialize the main-band of the UCIe link in a main-band initialization state with a plurality of redundant main-band lanes that are excluded as described above in relation to FIGS. 6-10.

Some implementation examples are described in the following numbered clauses:

1. A method for controlling a Universal Chiplet Interconnect Express (UCIe) link using a Link Training and Status State Machine (LTSSM), comprising:

determining a cause of a reset event in the LTSSM; and initializing a main-band of the UCIe link in a main-band initialization state (MBINIT) of the LTSSM with a plurality of redundant main-band lanes being excluded in response to the cause being other than a trainerror or a linkerror.

2. The method of clause 1, wherein the excluded plurality of redundant main-band lanes comprise at least one of a redundant data lane, a redundant clock lane, or a redundant valid lane of the main-band.

3. The method of clause 1, further comprising:

initializing a sideband of the UCIe link in a sideband initialization state (SBINIT) of the LTSSM with a plurality of redundant sideband lanes being excluded based on the cause of the reset event.

4. The method of clause 3, wherein the excluded plurality of redundant sideband lanes comprise at least one of a redundant data line or a redundant clock lane of the sideband.

5. The method of any one of clauses 1, 2, 3, and 4, wherein the determining the cause of the reset event, comprising:

checking a value of a redundant_recovery (RR) register, the value of the RR register indicating whether the reset event has been caused by at least one of the trainerror or the linkerror of the UCIe link.

6. The method of clause 5, further comprising:

setting the value of the RR register to a first value or a second value based on the cause of the reset event, the first value indicating the cause of the reset event being at least one of the trainerror or the linkerror, and the second value indicating the cause of the reset event being other than at least one of the trainerror or the linkerror.

7. The method of clause 6, further comprising:

checking the value of the RR register in a main-band training state (MBTRAIN) of the LTSSM; and resetting the value of the RR register to the second value in response to the cause of the reset event being at least one of the trainerror or the linkerror.

8. The method of any one of clauses 1, 2, 3, and 4, wherein the initializing the main-band of the UCIe link comprises:

refraining from sending a clock and data pattern on the plurality of redundant main-band lanes in response to the cause of the reset event being other than the trainerror or the linkerror.

9. The method of any one of clauses 1, 2, 3, and 4, wherein MBINIT comprises a plurality of substrates, wherein the initializing the main-band comprises:

skipping at least one or more of the plurality of substrates in response to the cause of the reset event being other than the trainerror or the linkerror.

10. The method of any one of clauses 1, 2, 3, and 4, wherein MBINIT comprises a plurality of substrates, wherein the initializing the main-band comprises:

excluding the plurality of redundant main-band lanes in at least one or more of the plurality of substrates.

11. An integrated circuit device comprising:
a communication interface configured to control a Universal Chiplet Interconnect Express (UCIe) link using a Link Training and Status State Machine (LTSSM); and
one or more processors connected to the communication interface, wherein the one or more processors being configured to:
determine a cause of a reset event in the LTSSM; and
initialize a main-band of the UCIe link in a main-band initialization state (MBINIT) of the LTSSM with a plurality of redundant main-band lanes being excluded in response to the cause being other than a trainerror or a linkerror.
12. The integrated circuit device of clause 11, wherein the excluded plurality of redundant main-band lanes comprise at least one of a redundant data lane, a redundant clock lane, or a redundant valid lane of the main-band.
13. The integrated circuit device of clause 11, wherein the one or more processors are further configured to:
initialize a sideband of the UCIe link in a sideband initialization state (SBINIT) with a plurality of redundant sideband lanes being excluded based on the cause of the reset event.
14. The integrated circuit device of clause 13, wherein the excluded plurality of redundant sideband lanes comprise at least one of a redundant data line or a redundant clock lane of the sideband.
15. The integrated circuit device of any one of clauses 11, 12, 13, and 14, wherein the one or more processors are further configured to:
check a value of a redundant_recovery (RR) register to determine the cause of the reset event, the value of the RR register indicating whether the reset event has been caused by at least one of the trainerror or the linkerror of the UCIe link.
16. The integrated circuit device of clause 15, wherein the one or more processors are further configured to:
set the value of the RR register to a first value or a second value based on the cause of the reset event,
the first value indicating the cause of the reset event being at least one of the trainerror or the linkerror, and
the second value indicating the cause of the reset event being other than at least one of the trainerror or the linkerror.
17. The integrated circuit device of clause 16, wherein the one or more processors are further configured to:
check the value of the RR register in a main-band training state (MBTRAIN) of the LTSSM; and
reset the value of the RR register to the second value in response to the cause of the reset event being at least one of the trainerror or the linkerror.
18. The integrated circuit device of any one of clauses 11, 12, 13, and 14, wherein the one or more processors are further configured to:
refrain from sending a clock and data pattern on the plurality of redundant main-band lanes in response to the cause of the reset event being other than the trainerror or the linkerror.
19. The integrated circuit device of any one of clauses 11, 12, 13, and 14, wherein MBINIT comprises a plurality of substrates, and the one or more processors are further configured to:
skip at least one or more of the plurality of substrates in response to the cause of the reset event being other than the trainerror or the linkerror.

20. The integrated circuit device of any one of clauses 11, 12, 13, and 14, wherein MBINIT comprises a plurality of substrates, and the one or more processors are further configured to:
exclude the plurality of redundant main-band lanes in at least one or more of the plurality of substrates.
21. An apparatus comprising a plurality of chiplets, comprising:
a Universal Chiplet Interconnect Express (UCIe) link connected between the plurality of chiplets;
means for determining a cause of a reset event in a Link Training and Status State Machine (LTSSM) used to control the UCIe link; and
means for initializing a main-band of the UCIe link in a main-band initialization state (MBINIT) of the LTSSM with a plurality of redundant main-band lanes being excluded in response to the cause being other than a trainerror or a linkerror.
22. The apparatus of clause 21, wherein the excluded plurality of redundant main-band lanes comprise at least one of a redundant data lane, a redundant clock lane, or a redundant valid lane of the main-band.
23. The apparatus of clause 21, further comprising:
means for initializing a sideband of the UCIe link in a sideband initialization state (SBINIT) of the LTSSM with a plurality of redundant sideband lanes being excluded based on the cause of the reset event.
24. The apparatus of clause 23, wherein the excluded plurality of redundant sideband lanes comprise at least one of a redundant data line or a redundant clock lane of the sideband.
25. The apparatus of any one of clauses 21, 21, 23, and 24, wherein the means for determining the cause of the reset event is configured to:
check a value of a redundant_recovery (RR) register, the value of the RR register indicating whether the reset event has been caused by at least one of the trainerror or the linkerror of the UCIe link.
26. The apparatus of clause 25, further comprising:
means for setting the value of the RR register to a first value or a second value based on the cause of the reset event,
the first value indicating the cause of the reset event being at least one of the trainerror or the linkerror, and
the second value indicating the cause of the reset event being other than at least one of the trainerror or the linkerror.
27. The apparatus of clause 26, further comprising:
means for checking the value of the RR register in a main-band training state (MBTRAIN) of the LTSSM; and
means for resetting the value of the RR register to the second value in response to the cause of the reset event being at least one of the trainerror or the linkerror.
28. The apparatus of any one of clauses 21, 21, 23, and 24, wherein the means for initializing the main-band of the UCIe link is configured to:
refrain from sending a clock and data pattern on the plurality of redundant main-band lanes in response to the cause of the reset event being other than the trainerror or the linkerror.
29. The apparatus of any one of clauses 21, 21, 23, and 24, wherein MBINIT comprises a plurality of substrates, wherein the means for initializing the main-band is configured to:

skip at least one or more of the plurality of substrates in response to the cause of the reset event being other than the trainerror or the linkerror.

30. The apparatus of any one of clauses 21, 21, 23, and 24, wherein MBINIT comprises a plurality of substrates, wherein the means for initializing the main-band is configured to:

exclude the plurality of redundant main-band lanes in at least one or more of the plurality of substrates.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

What is claimed is:

1. A method for controlling a Universal Chiplet Interconnect Express (UCIe) link using a Link Training and Status State Machine (LTSSM), comprising:

determining a cause of a reset event in the LTSSM; and
initializing a main-band of the UCIe link in a main-band initialization state (MBINIT) of the LTSSM with a plurality of redundant main-band lanes being excluded in response to the cause being other than a trainerror or a linkerror.

2. The method of claim 1, wherein the excluded plurality of redundant main-band lanes comprise at least one of a redundant data lane, a redundant clock lane, or a redundant valid lane of the main-band.

3. The method of claim 1, further comprising:
initializing a sideband of the UCIe link in a sideband initialization state (SBINIT) of the LTSSM with a plurality of redundant sideband lanes being excluded based on the cause of the reset event.

4. The method of claim 3, wherein the excluded plurality of redundant sideband lanes comprise at least one of a redundant data line or a redundant clock lane of the sideband.

5. The method of claim 1, wherein the determining the cause of the reset event, comprising:
checking a value of a redundant_recovery (RR) register, the value of the RR register indicating whether the reset event has been caused by at least one of the trainerror or the linkerror of the UCIe link.

6. The method of claim 5, further comprising:
setting the value of the RR register to a first value or a second value based on the cause of the reset event,
the first value indicating the cause of the reset event being at least one of the trainerror or the linkerror, and
the second value indicating the cause of the reset event being other than at least one of the trainerror or the linkerror.

7. The method of claim 6, further comprising:
checking the value of the RR register in a main-band training state (MBTRAIN) of the LTSSM; and
resetting the value of the RR register to the second value in response to the cause of the reset event being at least one of the trainerror or the linkerror.

8. The method of claim 1, wherein the initializing the main-band of the UCIe link comprises:
refraining from sending a clock and data pattern on the plurality of redundant main-band lanes in response to the cause of the reset event being other than the trainerror or the linkerror.

9. The method of claim 1, wherein MBINIT comprises a plurality of substrates, wherein the initializing the main-band comprises:
skipping at least one or more of the plurality of substrates in response to the cause of the reset event being other than the trainerror or the linkerror.

10. The method of claim 1, wherein MBINIT comprises a plurality of substrates, wherein the initializing the main-band comprises:
excluding the plurality of redundant main-band lanes in at least one or more of the plurality of substrates.

11. An integrated circuit device comprising:
a communication interface configured to control a Universal Chiplet Interconnect Express (UCIe) link using a Link Training and Status State Machine (LTSSM); and
one or more processors connected to the communication interface, wherein the one or more processors being configured to:
determine a cause of a reset event in the LTSSM; and
initialize a main-band of the UCIe link in a main-band initialization state (MBINIT) of the LTSSM with a plurality of redundant main-band lanes being excluded in response to the cause being other than a trainerror or a linkerror.

12. The integrated circuit device of claim 11, wherein the excluded plurality of redundant main-band lanes comprise at least one of a redundant data lane, a redundant clock lane, or a redundant valid lane of the main-band.

13. The integrated circuit device of claim 11, wherein the one or more processors are further configured to:
initialize a sideband of the UCIe link in a sideband initialization state (SBINIT) with a plurality of redundant sideband lanes being excluded based on the cause of the reset event.

14. The integrated circuit device of claim 13, wherein the excluded plurality of redundant sideband lanes comprise at least one of a redundant data line or a redundant clock lane of the sideband.

15. The integrated circuit device of claim 11, wherein the one or more processors are further configured to:
check a value of a redundant_recovery (RR) register to determine the cause of the reset event, the value of the RR register indicating whether the reset event has been caused by at least one of the trainerror or the linkerror of the UCIe link.

16. The integrated circuit device of claim 15, wherein the one or more processors are further configured to:
set the value of the RR register to a first value or a second value based on the cause of the reset event,
the first value indicating the cause of the reset event being at least one of the trainerror or the linkerror, and
the second value indicating the cause of the reset event being other than at least one of the trainerror or the linkerror.

17. The integrated circuit device of claim 16, wherein the one or more processors are further configured to:
check the value of the RR register in a main-band training state (MBTRAIN) of the LTSSM; and
reset the value of the RR register to the second value in response to the cause of the reset event being at least one of the trainerror or the linkerror.

18. The integrated circuit device of claim 11, wherein the one or more processors are further configured to:
refrain from sending a clock and data pattern on the plurality of redundant main-band lanes in response to the cause of the reset event being other than the trainerror or the linkerror.

19. The integrated circuit device of claim 11, wherein MBINIT comprises a plurality of substrates, and the one or more processors are further configured to:
skip at least one or more of the plurality of substrates in response to the cause of the reset event being other than the trainerror or the linkerror.

20. The integrated circuit device of claim 11, wherein MBINIT comprises a plurality of substrates, and the one or more processors are further configured to:
exclude the plurality of redundant main-band lanes in at least one or more of the plurality of substrates.

21. An apparatus comprising a plurality of chiplets, comprising:
a Universal Chiplet Interconnect Express (UCIe) link connected between the plurality of chiplets;
means for determining a cause of a reset event in a Link Training and Status State Machine (LTSSM) used to control the UCIe link; and
means for initializing a main-band of the UCIe link in a main-band initialization state (MBINIT) of the LTSSM with a plurality of redundant main-band lanes being excluded in response to the cause being other than a trainerror or a linkerror.

22. The apparatus of claim 21, wherein the excluded plurality of redundant main-band lanes comprise at least one of a redundant data lane, a redundant clock lane, or a redundant valid lane of the main-band.

23. The apparatus of claim 21, further comprising:
means for initializing a sideband of the UCIe link in a sideband initialization state (SBINIT) of the LTSSM with a plurality of redundant sideband lanes being excluded based on the cause of the reset event.

24. The apparatus of claim 23, wherein the excluded plurality of redundant sideband lanes comprise at least one of a redundant data line or a redundant clock lane of the sideband.

25. The apparatus of claim 21, wherein the means for determining the cause of the reset event is configured to:
check a value of a redundant_recovery (RR) register, the value of the RR register indicating whether the reset event has been caused by at least one of the trainerror or the linkerror of the UCIe link.

26. The apparatus of claim 25, further comprising:
means for setting the value of the RR register to a first value or a second value based on the cause of the reset event,
the first value indicating the cause of the reset event being at least one of the trainerror or the linkerror, and
the second value indicating the cause of the reset event being other than at least one of the trainerror or the linkerror.

27. The apparatus of claim 26, further comprising:
means for checking the value of the RR register in a main-band training state (MBTRAIN) of the LTSSM; and
means for resetting the value of the RR register to the second value in response to the cause of the reset event being at least one of the trainerror or the linkerror.

28. The apparatus of claim 21, wherein the means for initializing the main-band of the UCIe link is configured to:
refrain from sending a clock and data pattern on the plurality of redundant main-band lanes in response to the cause of the reset event being other than the trainerror or the linkerror.

29. The apparatus of claim 21, wherein MBINIT comprises a plurality of substrates, wherein the means for initializing the main-band is configured to:
skip at least one or more of the plurality of substrates in response to the cause of the reset event being other than the trainerror or the linkerror.

30. The apparatus of claim 21, wherein MBINIT comprises a plurality of substrates, wherein the means for initializing the main-band is configured to:
exclude the plurality of redundant main-band lanes in at least one or more of the plurality of substrates.

* * * * *